US012106883B2

(12) United States Patent
Takai et al.

(10) Patent No.: US 12,106,883 B2
(45) Date of Patent: Oct. 1, 2024

(54) MULTILAYER COIL COMPONENT

(71) Applicant: Murata Manufacturing Co., Ltd., Kyoto-fu (JP)

(72) Inventors: Shun Takai, Nagaokakyo (JP); Atsuo Hirukawa, Nagaokakyo (JP); Kenjirou Koshiji, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 602 days.

(21) Appl. No.: 17/463,211

(22) Filed: Aug. 31, 2021

(65) Prior Publication Data
US 2022/0076874 A1  Mar. 10, 2022

(30) Foreign Application Priority Data
Sep. 9, 2020  (JP) ................. 2020-151185

(51) Int. Cl.
*H01F 27/28* (2006.01)
*C03C 3/089* (2006.01)
*C03C 4/00* (2006.01)
*C03C 4/16* (2006.01)
*C03C 14/00* (2006.01)
(Continued)

(52) U.S. Cl.
CPC ......... *H01F 27/2804* (2013.01); *C03C 3/089* (2013.01); *C03C 4/16* (2013.01); *C03C 14/004* (2013.01); *H01F 27/29* (2013.01); *H01F 27/32* (2013.01); *C03C 2204/00* (2013.01); *C03C 2214/04* (2013.01); *H01F 2027/2809* (2013.01)

(58) Field of Classification Search
CPC ...... H01F 27/2804; H01F 27/29; H01F 27/32; H01F 2027/2809; C03C 3/089; C03C 4/16; C03C 14/004; C03C 2204/00; C03C 2214/04
See application file for complete search history.

(56) References Cited

U.S. PATENT DOCUMENTS 6,762,925 B2 * 7/2004 Uchida ............... H03H 7/0115
361/321.1
10,116,290 B1 * 10/2018 Wang ..................... H03L 7/093
(Continued)

FOREIGN PATENT DOCUMENTS

CN  109887707 A * 6/2019 ......... H01F 17/0013
JP  2000138120 A * 8/1999
(Continued)

*Primary Examiner* — Malcolm Barnes
(74) *Attorney, Agent, or Firm* — Studebaker & Brackett PC (57) ABSTRACT

A multilayer coil component includes a multilayer body in which a plurality of insulating layers are stacked and inside of which a coil is provided, and first and second outer electrodes provided on surfaces of the multilayer body and electrically connected to the coil. The multilayer body has first and second end surfaces, first and second main surfaces, and first and second side surfaces. The first outer electrode extends from at least part of the first end surface of the multilayer body across part of the first main surface and the second outer electrode extends from at least part of the second end surface of the multilayer body across part of the first main surface. A transmission coefficient S21 is −1.0 dB or higher in a range from 1 GHz to 40 GHz and is −1.5 dB or higher in a range from 40 GHz to 60 GHz.

8 Claims, 5 Drawing Sheets

(51) Int. Cl.
*H01F 27/29* (2006.01)
*H01F 27/32* (2006.01)

(56) References Cited

U.S. PATENT DOCUMENTS

| | | | | |
|---|---|---|---|---|
| 2005/0013083 | A1* | 1/2005 | Takazawa | H01F 17/0013 |
| | | | | 361/118 |
| 2011/0018673 | A1* | 1/2011 | Akazawa | H01F 17/0013 |
| | | | | 336/200 |
| 2012/0313743 | A1* | 12/2012 | Kimura | H01F 17/0013 |
| | | | | 336/200 |
| 2013/0088316 | A1* | 4/2013 | Odahara | H01F 27/292 |
| | | | | 336/200 |
| 2013/0293216 | A1* | 11/2013 | Yokoyama | H01F 17/0013 |
| | | | | 336/200 |
| 2016/0042862 | A1* | 2/2016 | Tachibana | H01F 17/0013 |
| | | | | 336/200 |
| 2016/0260539 | A1* | 9/2016 | Koizumi | H01F 17/045 |
| 2017/0345552 | A1* | 11/2017 | Nakano | H01F 41/043 |
| 2018/0057408 | A1* | 3/2018 | Kakuda | H01F 41/0246 |
| 2020/0105462 | A1* | 4/2020 | Nogi | H01F 27/2823 |

FOREIGN PATENT DOCUMENTS

| | | |
|---|---|---|
| JP | 2016-004885 A | 1/2016 |
| JP | 2019-186255 A | 10/2019 |
| KR | 10-2019-0115417 A | 10/2019 |

\* cited by examiner

MULTILAYER COIL COMPONENT

CROSS-REFERENCE TO RELATED APPLICATION

This application claims benefit of priority to Japanese Patent Application No. 2020-151185, filed Sep. 9, 2020, the entire content of which is incorporated herein by reference.

BACKGROUND

Technical Field

The present disclosure relates to a multilayer coil component.

Background Art

Japanese Unexamined Patent Application Publication No. 2019-186255 discloses a multilayer coil component that includes a multilayer body formed by stacking a plurality of insulating layers and having a coil built into the inside thereof, and outer electrodes.

It is stated that this multilayer coil component has excellent high-frequency characteristics and the transmission coefficient S21 at 40 GHz and 50 GHz is greater than or equal to a specific value.

In response to the increasing communication speed and miniaturization of electronic devices in recent years, it is demanded that multilayer coil components have satisfactory high-frequency characteristics in higher frequency bands (for example, a GHz band extending from 60 GHz).

In the multilayer coil component disclosed in Japanese Unexamined Patent Application Publication No. 2019-186255, a ferrite material is used as the material of insulating layers of the multilayer coil component. Ferrite materials have a high relative dielectric constant of around 15 and therefore a multilayer coil component that uses a ferrite material has large loss in a region around a frequency of 60 GHz and further improvements are desired.

SUMMARY

Accordingly, the present disclosure provides a multilayer coil component that is suitable for use in a region up to a frequency of around 60 GHz.

A multilayer coil component of an embodiment of the present disclosure includes a multilayer body in which a plurality of insulating layers are stacked in a stacking direction and inside of which a coil is provided, and outer electrodes that are provided on surfaces of the multilayer body and are electrically connected to the coil. The multilayer body has a first end surface and a second end surface, which face each other in a length direction, a first main surface and a second main surface, which face each other in a height direction perpendicular to the length direction, and a first side surface and a second side surface, which face each other in a width direction perpendicular to the length direction and the height direction. The outer electrodes include a first outer electrode that extends from at least part of the first end surface of the multilayer body across part of the first main surface and a second outer electrode that extends from at least part of the second end surface of the multilayer body across part of the first main surface. The stacking direction of the multilayer body and a coil axis direction of the coil are parallel to the first main surface. The insulating layers include a ferrite phase and a non-magnetic phase composed of a material having a lower dielectric constant than a ferrite material that constitutes the ferrite phase. A transmission coefficient S21 of the multilayer coil component is −1.0 dB or higher in a range from 1 GHz to 40 GHz and is −1.5 dB or higher in a range from 40 GHz to 60 GHz.

The embodiment of the present disclosure can provide a multilayer coil component that is suitable for use in a range up to a frequency of around 60 GHz.

Other features, elements, characteristics and advantages of the present disclosure will become more apparent from the following detailed description of preferred embodiments of the present disclosure with reference to the attached drawings.

DETAILED DESCRIPTION

Hereafter, a multilayer coil component of the present disclosure will be described.

However, the present disclosure is not limited to the following configurations and modes and the present disclosure can be applied with appropriate modifications within a range that does not alter the gist of the present disclosure. Combinations of two or more preferable configurations or modes of the present disclosure described hereafter are also included in the scope of the present disclosure.

Figure 1:
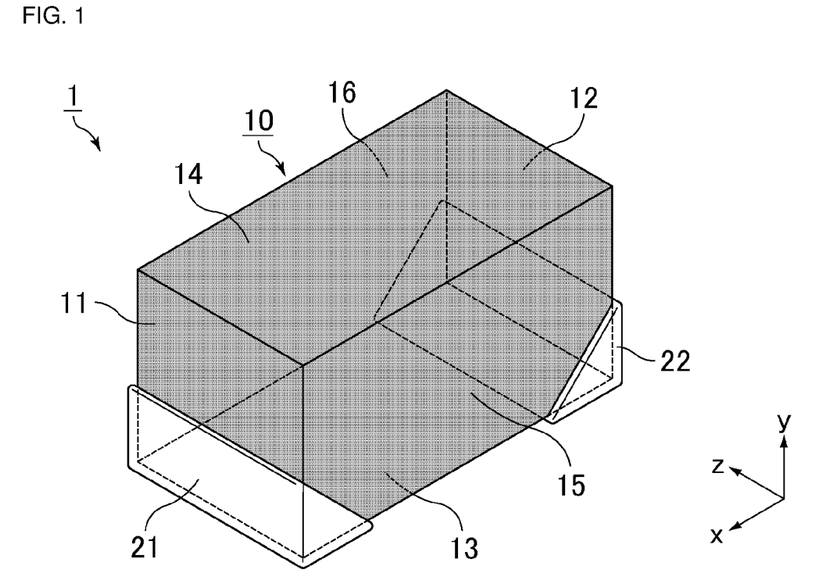
FIG. 1 is a perspective view schematically illustrating an example of a multilayer coil component according to the present disclosure.

FIG. 1 is a perspective view schematically illustrating an example of a multilayer coil component of the present disclosure.

A multilayer coil component 1 illustrated in FIG. 1 includes a multilayer body 10, a first outer electrode 21, and a second outer electrode 22. The multilayer body 10 has a substantially rectangular parallelepiped shape having six surfaces. The configuration of the multilayer body 10 will be described later, but the multilayer body 10 is formed by stacking a plurality of insulating layers in the stacking direction and has a coil provided thereinside. The first outer electrode 21 and the second outer electrode 22 are electrically connected to the coil.

In a multilayer coil component and a multilayer body described in the present specification, a length direction, a height direction, and a width direction are respectively taken to be an x direction, a y direction, and a z direction in FIG. 1. Here, the length direction (x direction), the height direction (y direction), and the width direction (z direction) are perpendicular to each other.

The length direction (x direction) is a direction that is parallel to the stacking direction.

As illustrated in FIG. 1, the multilayer body 10 has a first end surface 11 and a second end surface 12, which face each other in the length direction (x direction), a first main surface 13 and a second main surface 14, which face each other in the height direction (y direction) perpendicular to the length direction, and a first side surface 15 and a second side surface 16, which face each other in the width direction (z direction) perpendicular to the length direction and the height direction.

Although not illustrated in FIG. 1, corner portions and edge portions of the multilayer body 10 are preferably rounded. The term "corner portion" refers to a part of the multilayer body where three surfaces intersect and the term "edge portion" refers to a part of the multilayer body where two surfaces intersect.

The first outer electrode and the second outer electrode are outer electrodes that extend along a main surface of the multilayer body from at least part of each end surface of the multilayer body.

In the multilayer coil component 1 illustrated in FIG. 1, the first outer electrode 21 is disposed so as to cover part of the first end surface 11 of the multilayer body 10 and so as to extend from the first end surface 11 and cover part of the first main surface 13.

In FIG. 1, the height of the part of the first outer electrode 21 that covers the first end surface 11 of the multilayer body 10 is constant, but the shape of the first outer electrode 21 is not particularly limited so long as the first outer electrode 21 covers part of the first end surface 11 of the multilayer body 10. For example, the first outer electrode 21 may have an arch-like shape that increases in height from the ends toward the center thereof on the first end surface 11 of the multilayer body 10. In addition, the length of the part of the first outer electrode 21 that covers the first main surface 13 of the multilayer body 10 is constant, but the shape of the first outer electrode 21 is not particularly limited so long as the first outer electrode 21 covers part of the first main surface 13 of the multilayer body 10. For example, the first outer electrode 21 may have an arch-like shape that increases in length from the ends toward the center thereof on the first main surface 13 of the multilayer body 10.

As illustrated in FIG. 1, the first outer electrode 21 may be additionally disposed so as to extend from the first end surface 11 and the first main surface 13 and cover part of the first side surface 15 and part of the second side surface 16. In this case, the parts of the first outer electrode 21 covering the first side surface 15 and the second side surface 16 are preferably formed in a diagonal shape relative to both the edge portions that intersect the first end surface 11 and the edge portions that intersect the first main surface 13. However, the first outer electrode 21 does not have to be disposed so as to cover part of the first side surface 15 and part of the second side surface 16.

In the multilayer coil component 1 illustrated in FIG. 1, the second outer electrode 22 is disposed so as to cover part of the second end surface 12 of the multilayer body 10 and so as to extend from the second end surface 12 and cover part of the first main surface 13.

Similarly to the first outer electrode 21, the second outer electrode 22 covers a region of the second end surface 12 that includes the edge portion that intersects the first main surface 13.

Similarly to the first outer electrode 21, the shape of the second outer electrode 22 is not particularly limited so long as the second outer electrode 22 covers part of the second end surface 12 of the multilayer body 10. For example, the second outer electrode 22 may have an arch-like shape that increases in height from the ends toward the center thereof on the second end surface 12 of the multilayer body 10. Furthermore, the shape of the second outer electrode 22 is not particularly limited so long as the second outer electrode 22 covers part of the first main surface 13 of the multilayer body 10. For example, the second outer electrode 22 may have an arch-like shape that increases in length from the ends toward the center thereof on the first main surface 13 of the multilayer body 10.

Similarly to the first outer electrode 21, the second outer electrode 22 may be additionally disposed so as to extend from the second end surface 12 and the first main surface 13 and cover part of the first side surface 15 and part of the second side surface 16. In this case, the parts of the second outer electrode 22 covering the first side surface 15 and the second side surface 16 are preferably formed in a diagonal shape relative to both the edge portions that intersect the second end surface 12 and the edge portions that intersect the first main surface 13. However, the second outer electrode 22 does not have to be disposed so as to cover part of the first side surface 15 and part of the second side surface 16.

The first outer electrode 21 and the second outer electrode 22 are disposed in the manner described above, and therefore the first main surface 13 of the multilayer body 10 serves as a mounting surface when the multilayer coil component 1 is mounted on a substrate.

Furthermore, different from the form illustrated in FIG. 1, the first outer electrode may cover the entirety of the first end surface of the multilayer body and may extend from the first end surface and cover part of the first main surface, part of the second main surface, part of the first side surface, and part of the second side surface.

In addition, the second outer electrode may cover the entirety of the second end surface of the multilayer body and may extend from the second end surface and cover part of the first main surface, part of the second main surface, part of the first side surface, and part of the second side surface.

In this case, any one out of the first main surface, the second main surface, the first side surface, and the second side surface of the multilayer body may serve as a mounting surface.

Although the size of the multilayer coil component of the present disclosure is not particularly limited, the multilayer coil component is preferably the 0603 size, the 0402 size, or the 1005 size.

The transmission coefficient S21 of the multilayer coil component of the present disclosure is around −1.0 dB or higher in a range from around 1 GHz to around 40 GHz and is around −1.5 dB or higher in a range from around 40 GHz to around 60 GHz.

The transmission coefficient S21 is obtained from the ratio of the power of a transmitted signal to the power of an input signal. The transmission coefficient S21 is basically a dimensionless quantity, but is usually expressed in units of dB by taking the common logarithm.

The transmission coefficient S21 at each frequency is obtained by measuring the powers of an input signal and a transmitted signal of the multilayer coil component using a network analyzer. The transmission coefficient S21 at each frequency can be obtained by obtaining the transmission coefficient S21 while varying the frequency.

A specific example of a measurement device used for measuring the transmission coefficient S21 will be described in the Examples section.

"The transmission coefficient S21 is around −1.0 dB or higher in a range from around 1 GHz to around 40 GHz" means that the transmission coefficient S21 is −1.0 dB or higher across the entire range from 1 GHz to 40 GHz when the transmission coefficient S21 is measured while varying the frequency.

Furthermore, "the transmission coefficient S21 is around −1.5 dB or higher in a range from around 40 GHz to around 60 GHz" means that the transmission coefficient S21 is −1.5 dB or higher across the entire range from 40 GHz to 60 GHz when the transmission coefficient S21 is measured while varying the frequency.

If the transmission coefficient S21 of the multilayer coil component satisfies the above characteristics, the multilayer coil component can be suitably used in a bias-tee circuit in an optical communication circuit, for example. In particular, the multilayer coil component can be more suitably used in an optical communication module that is used in a frequency range up to around 60 GHz.

Furthermore, the transmission coefficient S21 of the multilayer coil component is preferably around −0.5 dB or higher in a range from around 1 GHz to around 40 GHz. In addition, the transmission coefficient S21 is preferably around −1.2 dB or higher in a range from around 40 GHz to around 60 GHz.

The insulating layers include a ferrite phase and a non-magnetic phase composed of a material having a lower dielectric constant than the ferrite material that constitutes the ferrite phase.

The ferrite phase is a phase including a ferrite material and may be a phase consisting of only a ferrite material.

The ferrite phase is preferably composed of a Ni—Cu—Zn ferrite material. The inductance of the multilayer coil component is increased when the ferrite phase is composed of a Ni—Cu—Zn ferrite material.

The Ni—Cu—Zn ferrite material preferably contains $Fe_2O_3$ at around 40 mol % to around 49.5 mol %, ZnO at around 5 mol % to around 35 mol %, CuO at around 4 mol % to around 12 mol %, and the remainder NiO. These oxides may contain unavoidable impurities.

The Ni—Cu—Zn ferrite material may additionally contain additives such as $Mn_3O_4$, $Bi_2O_3$, $Co_3O_4$, and $SnO_2$.

Furthermore, the ferrite phase is a phase that contains Fe when subjected to elemental analysis, and preferably contains Fe, Zn, Cu, and Ni. In addition, the ferrite phase may additionally contain Mn, Bi, Co, Sn, and so on.

The ferrite phase preferably contains Fe at around 40 mol % to around 49.5 mol % in terms of $Fe_2O_3$, Zn at around 2 mol % to around 35 mol % in terms of ZnO, Cu at around 6 mol % to around 13 mol % in terms of CuO, and Ni at around 10 mol % to around 45 mol % in terms of NiO.

The non-magnetic phase is a phase composed of a material having a lower dielectric constant than the ferrite material.

Examples of the material constituting the non-magnetic phase include glass materials, forsterite ($2MgO—SiO_2$), and wilmite ($aZnO—SiO_2$ (where a lies in a range from around 1.8 to around 2.2)). As a glass material, borosilicate glass is preferred.

The borosilicate glass preferably contains Si at a ratio of around 80 wt % to around 85 wt % in terms of $SiO_2$, B at a ratio of around 10 wt % to around 25 wt % in terms of $B_2O_3$, an alkali metal A at a ratio of around 0.5 wt % to around 5 wt % in terms of $A_2O$, and Al at a ratio of around 0 wt % to around 5 wt % in terms of $Al_2O_3$. K, Na, or the like may be used as the alkali metal A.

The ferrite phase and the non-magnetic phase are distinguished as follows. First, a cross section of the multilayer body of the multilayer coil component along the stacking direction is exposed by grinding down the multilayer body and then elemental mapping is performed on the multilayer body by performing scanning transmission electron microscopy-energy dispersive X-ray analysis (STEM-EDX). Then, the two phases are distinguished from each other by regarding regions where the Fe element is present as making up the ferrite phase and regions other than the ferrite phase as making up the non-magnetic phase.

A cross section taken along the stacking direction is a cross section like that illustrated in FIG. 2 described later.

Regarding the ferrite phase and the non-magnetic phase distinguished in this way, the ferrite material making up the ferrite phase has a high dielectric constant and the material making up the non-magnetic phase has a lower dielectric constant than the ferrite material.

The relative dielectric constant of the ferrite material may be, for example, around 14.5 to around 15.5.

Furthermore, the relative dielectric constant of the material making up the non-magnetic phase is not particularly limited so long as the relative dielectric constant is lower than the relative dielectric constant of the ferrite material, but the relative dielectric constant of the material making up the non-magnetic phase is, for example, preferably less than or equal to around 7.0 and more preferably less than or equal to around 5.0.

The dielectric constant of the insulating layers forming the multilayer coil component is reduced due to the insulating layers containing the non-magnetic phase, which is composed of a material having a lower dielectric constant than the ferrite material. Loss in the multilayer coil component is reduced due to the dielectric constant of the insulating layers being reduced, and the loss can be particularly reduced in a range up to a frequency of around 60 GHz. Therefore, the multilayer coil component of the present disclosure is a multilayer coil component that is suitable for use in a region up to a frequency of around 60 GHz.

The structural formula of the ferrite material constituting the ferrite phase is determined and the structural formula of the material constituting the non-magnetic phase is determined by performing the elemental mapping described above in order to determine the relative dielectric constant of the ferrite material and the relative dielectric constant of the material constituting the non-magnetic phase. Then, the relative dielectric constants of the compounds with these structural formulas are obtained from a publicly available database. The relative dielectric constant of the ferrite material and the relative dielectric constant of the material constituting the non-magnetic phase can be determined using this procedure.

In addition, a dielectric constant measurement test piece may be manufactured by molding the ferrite material into a prescribed shape and then forming electrodes on the test piece, and then the electrostatic capacitance of the test piece may be measured under prescribed conditions, and the relative dielectric constant of the ferrite material may be obtained on the basis of the measured value of the electrostatic capacitance and the dimensions of the dielectric constant measurement test piece. Similarly, the relative dielectric constant of the material constituting the non-magnetic phase may be obtained by manufacturing a dielectric constant measurement test piece by molding the material constituting the non-magnetic phase into a prescribed shape.

The ratio of the volume of the non-magnetic phase to the total volume of the ferrite phase and the non-magnetic phase is preferably around 55 vol % to around 80 vol %. The characteristics of the transmission coefficient S21 of the multilayer coil component in a high-frequency region can be made to lie in a more suitable range by having the ratio of the volume of the non-magnetic phase to the total volume of the ferrite phase and the non-magnetic phase be from around 55 vol % to around 80 vol %.

When the ratio of the volume of the non-magnetic phase to the total volume of the ferrite phase and the non-magnetic phase is less than around 55 vol %, the amount of material having a low relative dielectric constant is small, and therefore the effect of reducing loss in the high-frequency region is reduced by a corresponding amount.

On the other hand, when the ratio of the volume of the non-magnetic phase to the total volume of the ferrite phase and the non-magnetic phase is greater than around 80 vol %, the strength of the multilayer body may be inadequate due to the proportion of material made up of the non-magnetic phase being too high.

From the viewpoint of improving the high-frequency characteristics of the multilayer coil component, the ratio of the volume of the non-magnetic phase to the total volume of the ferrite phase and the non-magnetic phase is preferably around 60 vol % to around 80 vol %.

The ratio of the volume of the non-magnetic phase to the total volume of the ferrite phase and the non-magnetic phase is determined as follows. First, a cross section of the multilayer body of the multilayer coil component along the stacking direction is exposed by grinding down the multilayer body up to a center part thereof in a direction perpendicular to the stacking direction.

Next, the ferrite phase and the non-magnetic phase are distinguished from each other as described above by extracting three 50 μm square regions from the vicinity of the center of the exposed cross section and subjecting the regions to elemental mapping using scanning transmission electron microscopy-energy dispersive X-ray analysis. Then, the ratio of the area of the non-magnetic phase to the total area of the ferrite phase and the non-magnetic phase is measured using image analysis software from the obtained elemental mapping image for each of the three regions described above. After that, an average value is calculated from the measured values of these area ratios and this average value is taken to be the ratio of the volume of the non-magnetic phase to the total volume of the ferrite phase and the non-magnetic phase.

Furthermore, the ratio of the volume of forsterite to the total volume of the non-magnetic phase is preferably around 2 vol % to around 8 vol %.

The ratio of the volume of forsterite contained in the non-magnetic phase can be calculated by distinguishing regions where the element Mg, which is an element contained in forsterite, is present as regions where forsterite is present and measuring the ratio of the area of the regions where forsterite is present to the area of the non-magnetic phase.

The strength of the multilayer body is improved when around 2 vol % to around 8 vol % of the non-magnetic phase consists of forsterite.

The insulating layers preferably contain B at around 4.3 wt % to around 8.0 wt % in terms of $B_2O_3$, Si at around 27.6 wt % to around 51.4 wt % in terms of $SiO_2$, Mg at around 1.1 wt % to around 2.1 wt % in terms of MgO, Fe at around 24.7 wt % to around 43.5 wt % in terms of $Fe_2O_3$, Ni at around 3.3 wt % to around 5.9 wt % in terms of NiO, Zn at around 7.7 wt % to around 13.5 wt % in terms of ZnO, and Cu at around 2.0 wt % to around 3.6% in terms of CuO.

The composition of the insulating layers is confirmed by analysis performed using inductively coupled plasma atomic emission spectroscopy (ICP-AES).

Next, an example of a coil built into the multilayer body of the multilayer coil component will be described.

The coil is formed by electrically connecting a plurality of coil conductors, which are stacked in the stacking direction together with the insulating layers, to one another.

Figure 2:
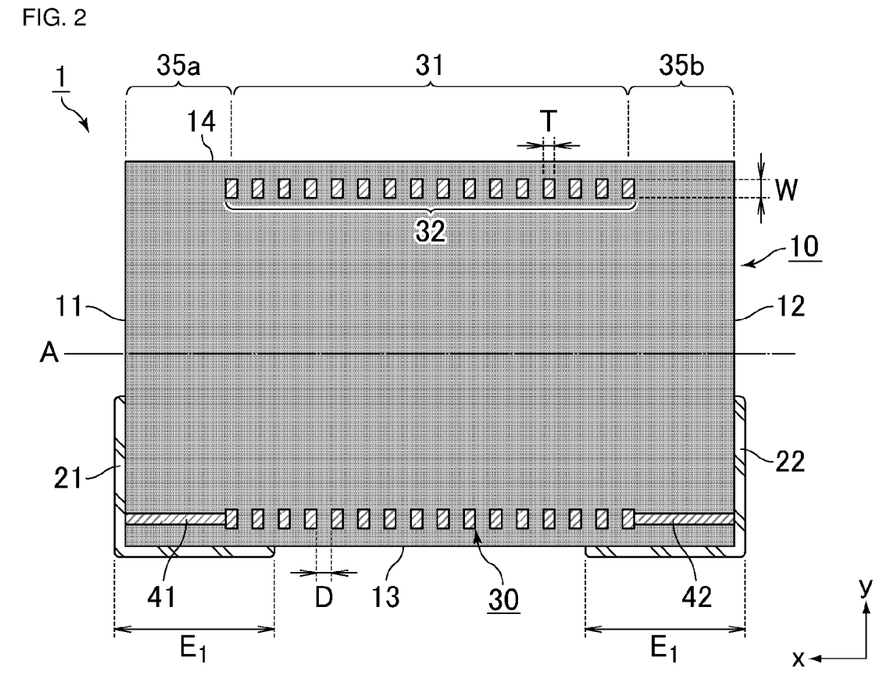
FIG. 2 is a sectional view schematically illustrating an example of the multilayer coil component of the present disclosure.
Figure 3:
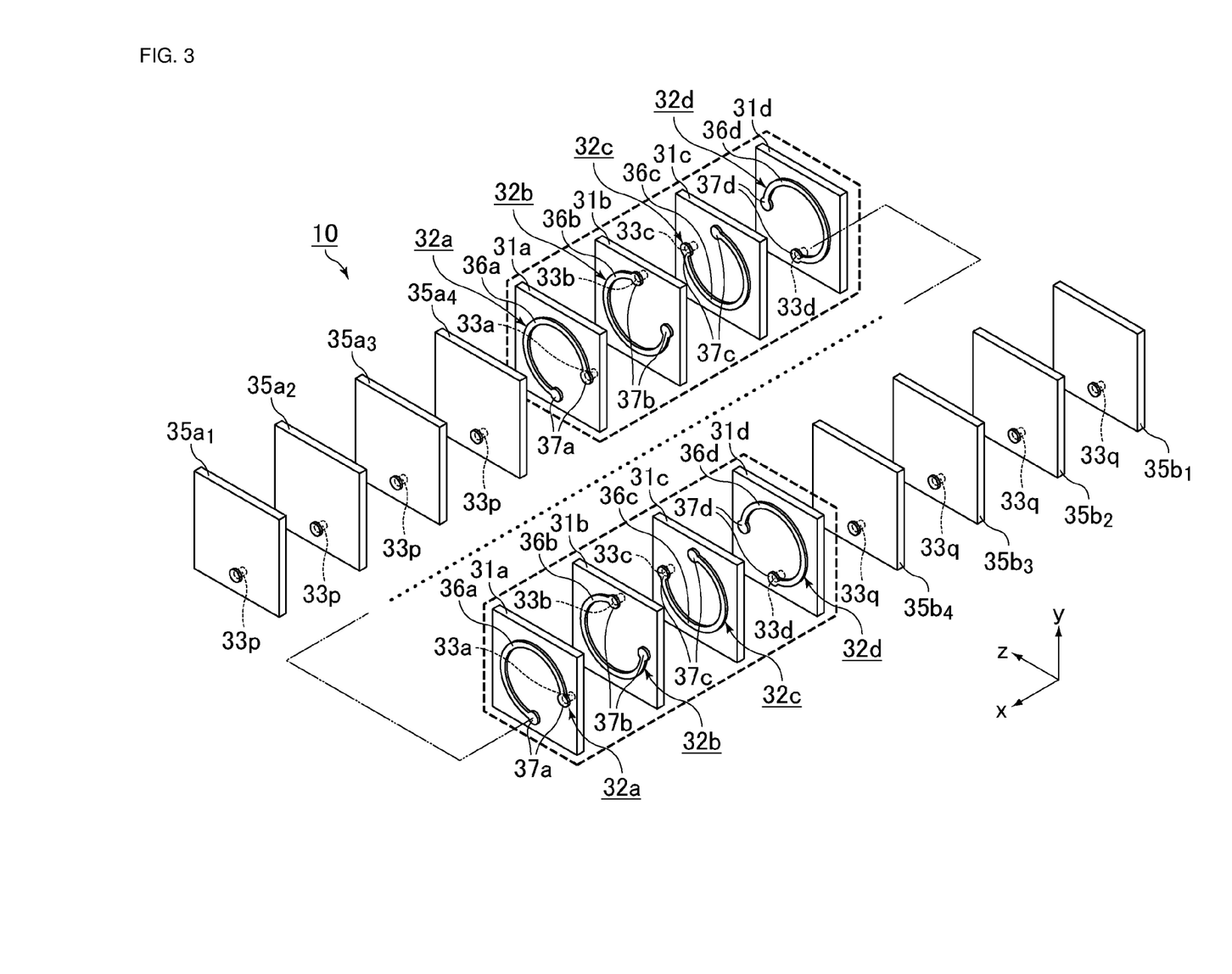
FIG. 3 is an exploded schematic perspective view schematically illustrating the states of insulating layers constituting the multilayer coil component illustrated in FIG. 2.
Figure 4:
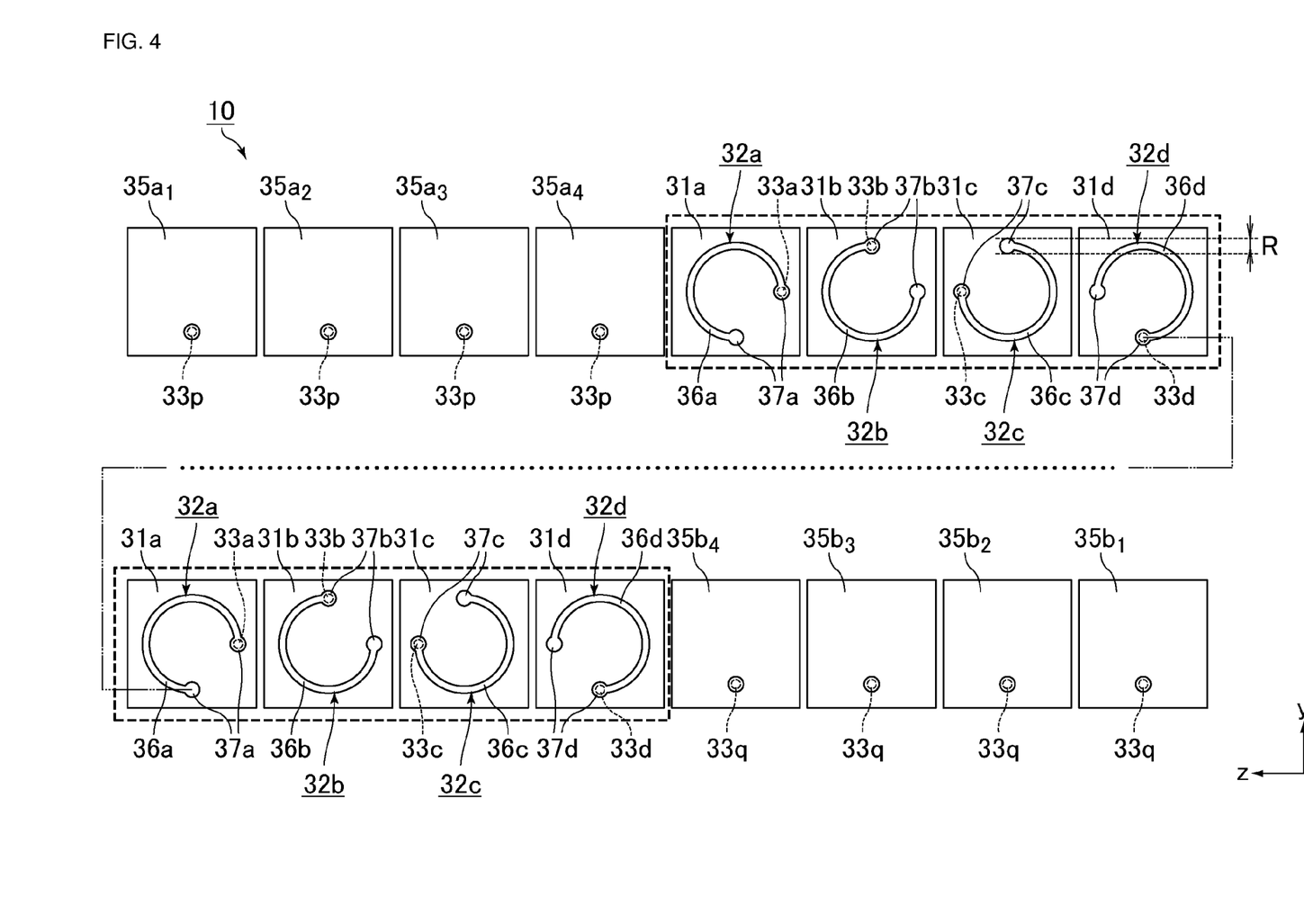
FIG. 4 is an exploded schematic plan view schematically illustrating the states of insulating layers constituting the multilayer coil component illustrated in FIG. 2.

FIG. 2 is a sectional view schematically illustrating an example of a multilayer coil component of the present disclosure, FIG. 3 is an exploded schematic perspective view schematically illustrating the states of insulating layers of the multilayer coil component illustrated in FIG. 2, and FIG. 4 is an exploded schematic plan view schematically illustrating the states of the insulating layers of the multilayer coil component illustrated in FIG. 2.

FIG. 2 illustrates insulating layers, coil conductors, connection conductors, and a stacking direction of the multilayer body in a schematic manner, and the actual shapes, connections, and so forth are not depicted with strict accuracy. For example, the coil conductors are connected to each other by via conductors.

As illustrated in FIG. 2, the multilayer coil component 1 includes: the multilayer body 10, which has a coil built into the inside thereof, that is formed by electrically connecting together a plurality of coil conductors 32 that are stacked together with insulating layers; and the first outer electrode 21 and the second outer electrode 22, which are electrically connected to the coil.

The multilayer body 10 includes a region in which the coil conductors 32 are disposed and regions in which a first connection conductor 41 and a second connection conductor 42 are arranged. The stacking direction of the multilayer body 10 and the axial direction of the coil (coil axis A illustrated in FIG. 2) are parallel to the first main surface 13.

As illustrated in FIGS. 3 and 4, the multilayer body 10 includes an insulating layer 31a, an insulating layer 31b, an insulating layer 31c, and an insulating layer 31d as insulating layers 31 in FIG. 2. The multilayer body 10 includes an insulating layer 35a1, an insulating layer 35a2, an insulating layer 35a3, and an insulating layer 35a4 as insulating layers 35a in FIG. 2. The multilayer body 10 includes an insulating layer 35b1, an insulating layer 35b2, an insulating layer 35b3, and an insulating layer 35b4 as insulating layers 35b in FIG. 2.

A coil 30 includes a coil conductor 32a, a coil conductor 32b, a coil conductor 32c, and a coil conductor 32d as the coil conductors 32 in FIG. 2.

The coil conductor 32a, the coil conductor 32b, the coil conductor 32c, and the coil conductor 32d are respectively disposed on main surfaces of the insulating layer 31a, the insulating layer 31b, the insulating layer 31c, and the insulating layer 31d.

The length of each of the coil conductors 32a, 32b, 32c, and 32d is the length of ¾ of a turn of the coil 30. In other words, four coil conductors are stacked on top of one another in order to form three turns of the coil 30. In the multilayer body 10, the coil conductor 32a, the coil conductor 32b, the coil conductor 32c, and the coil conductor 32d are repeatedly stacked as a single unit (three turns).

The coil conductor 32a includes a line portion 36a and a land portion 37a disposed at an end portion of the line portion 36a. The coil conductor 32b includes a line portion 36b and a land portion 37b disposed at an end portion of the line portion 36b. The coil conductor 32c includes a line portion 36c and a land portion 37c disposed at an end portion of the line portion 36c. The coil conductor 32d includes a line portion 36d and a land portion 37d disposed at an end portion of the line portion 36d.

A via conductor 33a, a via conductor 33b, a via conductor 33c, and a via conductor 33d are disposed so as to respectively penetrate through the insulating layer 31a, the insulating layer 31b, the insulating layer 31c, and the insulating layer 31d in the stacking direction.

The insulating layer 31a provided with the coil conductor 32a and the via conductor 33a, the insulating layer 31b provided with the coil conductor 32b and the via conductor 33b, the insulating layer 31c provided with the coil conductor 32c and the via conductor 33c, and the insulating layer 31d provided with the coil conductor 32d and the via conductor 33d are repeatedly stacked as a single unit (parts surrounded by dotted lines in FIGS. 3 and 4). Thus, the land portion 37a of the coil conductor 32a, the land portion 37b of the coil conductor 32b, the land portion 37c of the coil conductor 32c, and the land portion 37d of the coil conductor 32d are connected to each other by the via conductor 33a, the via conductor 33b, and the via conductor 33c, and the via conductor 33d. In other words, the land portions of coil conductors that are adjacent to each other in the stacking direction are connected to each other by the via conductors.

The solenoid-shaped coil 30 built into the multilayer body 10 is formed in the above-described manner.

In plan view in the stacking direction, the coil 30 formed of the coil conductors 32a, the coil conductors 32b, the coil conductors 32c, and the coil conductors 32d may have a substantially circular shape or may have a substantially polygonal shape. In the case where the coil 30 has a substantially polygonal shape in plan view in the stacking direction, the coil diameter of the coil 30 is the diameter of an area-equivalent circle of the polygonal shape and the coil axis of the coil 30 is an axis that extends in the stacking direction through the center of the polygonal shape.

Via conductors 33p are disposed so as to penetrate in the stacking direction through the insulating layer 35a1, the insulating layer 35a2, the insulating layer 35a3, and the insulating layer 35a4. Land portions connected to the via conductors 33p may be disposed on the main surfaces of the insulating layer 35a1, the insulating layer 35a2, the insulating layer 35a3, and the insulating layer 35a4.

The insulating layer 35a1 provided with the via conductor 33p, the insulating layer 35a2 provided with the via conductor 33p, the insulating layer 35a3 provided with the via conductor 33p, and the insulating layer 35a4 provided with the via conductor 33p are stacked so as to overlap the insulating layer 31a provided with the coil conductor 32a and the via conductor 33a. As a result, the via conductors 33p are connected to each other and form the first connection conductor 41 and the first connection conductor 41 is exposed at the first end surface 11. As a result, the first outer electrode 21 and the coil 30 are connected to each other via the first connection conductor 41.

As described above, the first connection conductor 41 is preferably connected in a straight line between the first outer electrode 21 and the coil 30. The phrase "the first connection conductor 41 is connected in a straight line between the first outer electrode 21 and the coil 30" means that the via conductors 33p forming the first connection conductor 41 overlap one another in plan view in the stacking direction and it is not necessary for the via conductors 33p to be perfectly aligned in a straight line.

Via conductors 33q are disposed so as to penetrate in the stacking direction through the insulating layer 35b1, the insulating layer 35b2, the insulating layer 35b3, and the insulating layer 35b4. Land portions connected to the via conductors 33q may be disposed on the main surfaces of the insulating layer 35b1, the insulating layer 35b2, the insulating layer 35b3, and insulating layer 35b4.

The insulating layer 35b1 provided with the via conductor 33q, the insulating layer 35b2 provided with the via conductor 33q, the insulating layer 35b3 provided with the via conductor 33q, and the insulating layer 35b4 provided with the via conductor 33q are stacked so as to overlap the insulating layer 31d provided with the coil conductor 32d and the via conductor 33d. As a result, the via conductors 33q are connected to each other and form the second connection conductor 42 and the second connection conductor 42 is exposed at the second end surface 12. As a result, the second outer electrode 22 and the coil 30 (coil conductor 32d) are connected to each other via the second connection conductor 42.

As described above, the second connection conductor 42 is preferably connected in a straight line between the second outer electrode 22 and the coil 30. The phrase "the second connection conductor 42 is connected in a straight line between the second outer electrode 22 and the coil 30" means that the via conductors 33q forming the second connection conductor 42 overlap one another in plan view in the stacking direction and it is not necessary for the via conductors 33q to be perfectly aligned in a straight line.

In the case where land portions are connected to the via conductors 33p forming the first connection conductor 41 and the via conductors 33q forming the second connection conductor 42, the shape of the first connection conductor 41 and the shape of the second connection conductor 42 refer to the shapes without the land portions.

In FIGS. 3 and 4, a case is exemplified in which four coil conductors are stacked in order to form three turns of the coil 30, i.e., the repeating shape is the shape of ¾ of a turn, but the number of coil conductors that are stacked in order to form one turn of the coil is not particularly limited.

For example, the number of coil conductors stacked in order to form one turn of the coil may be two, i.e., the repeating shape may be the shape of ½ a turn.

The coil conductors forming the coil preferably overlap in plan view in the stacking direction. In addition, the coil preferably has a substantially circular shape in plan view in the stacking direction. In the case where the coil includes land portions, the shape of the coil is taken to be the shape obtained when the land portions are removed (i.e., the shape of the line portions).

In addition, in the case where land portions are connected to the via conductors forming the connection conductors, the shape of the connection conductors is the shape obtained when the land portions are removed (i.e., the shape of the via conductors).

The coil conductors illustrated in FIG. 3 are shaped so that the repeating pattern has a substantially circular shape, but the coil conductors may instead be shaped so that the repeating pattern has a substantially polygonal shape such as a substantially quadrangular shape.

In addition, the repeating shape of the coil conductors may be a ½ turn shape rather than a ¾ turn shape.

The first outer electrode and the second outer electrode may have a single layer structure or may have a multilayer structure.

When the first outer electrode and the second outer electrode each have a single layer structure, for example, silver, gold, copper, palladium, nickel, aluminum, or an alloy containing at least one of these metals may be used as the constituent material of the outer electrodes.

When the first outer electrode and the second outer electrode each have a multilayer structure, each outer electrode may include, for example, a base electrode layer containing silver, a nickel coating, and a tin coating in order from the side near the surface of the multilayer body. Furthermore, each outer electrode may include a base electrode layer containing silver, a nickel coating, and a gold coating.

In a multilayer coil component having the configuration illustrated in FIGS. 2, 3, and 4, when the size of the multilayer coil component is the 0603 size, the multilayer coil component is preferably designed as follows in order to further improve the high-frequency characteristics.

The number of turns of the coil is preferably around 36 turns to around 42 turns. When the number of turns lies in the range, the total electrostatic capacitance between the coil conductors can be reduced and therefore the transmission coefficient S21 can be made to lie in a suitable range.

In addition, the coil length is preferably around 0.41 mm to around 0.48 mm.

The width of the coil conductors is preferably around 45 µm to around 75 µm. The width of the coil conductors is a dimension indicated by double arrows W in FIG. 2.

The thickness of the coil conductors is preferably around 3.5 µm to around 6.0 µm. The thickness of the coil conductors is a dimension indicated by double arrows T in FIG. 2.

The distance between the coil conductors is preferably around 3.0 µm to around 5.0 µm. The distance between the coil conductors is a dimension indicated by double arrows D in FIG. 2.

The diameter of the land portions of the coil conductors is preferably around 30 µm to around 50 µm. The diameter of the land portions of the coil conductors is a dimension indicated by double arrows R in FIG. 4.

When the first main surface of the multilayer body is used as the mounting surface, the length of the part of the first outer electrode that covers the first main surface of the multilayer body and the length of the part of the second outer electrode that covers the first main surface of the multilayer body are preferably around 0.20 mm or lower. Furthermore, these lengths are preferably around 0.10 mm or higher.

The length of the part of the first outer electrode covering the first main surface of the multilayer body and the length of the part of the second outer electrode covering the first main surface of the multilayer body are dimensions indicated by double arrows E1 in FIG. 2.

Furthermore, the relative dielectric constant of the insulating layers constituting the multilayer coil component of the present disclosure is preferably around 8.5 or lower. In addition, the relative dielectric constant is preferably around 8.0 or lower and may be around 6.5 or higher.

The relative dielectric constant of the insulating layers constituting the multilayer coil component can be measured in the following manner.

A dielectric constant measurement test piece is fabricated by molding an insulating layer into a prescribed shape (for example, a disk shape). Electrodes are formed on the test piece, and then the electrostatic capacitance is measured under conditions of a frequency of 1 MHz and a voltage of 1 Vrms. The relative dielectric constant is calculated from the diameter and thickness of the disk-shaped test piece on the basis of the measured value of the electrostatic capacitance.

The multilayer coil component of the present disclosure is manufactured using the following method, for example.

Ferrite Material Manufacturing Process $Fe_2O_3$, ZnO, CuO, and NiO are weighed so as to be at a prescribed ratio.

These oxides may contain unavoidable impurities. Next, a slurry is prepared by wet mixing these weighed materials together and then pulverizing the materials. At this time, additives such as $Mn_3O_4$, $Bi_2O_3$, $Co_3O_4$, $SiO_2$, and $SnO_2$ may be added. The resulting slurry is dried and then preliminarily fired. The preliminary firing temperature is, for example, around 700° ° C. to around 800° C. A powdered ferrite material is manufactured in this way.

The ferrite material preferably contains $Fe_2O_3$ at around 40 mol % to around 49.5 mol %, ZnO at around 2 mol % to around 35 mol %, CuO at around 6 mol % to around 13 mol %, and NiO at around 10 mol % to around 45 mol %.

Non-Magnetic Material Manufacturing Process

A non-magnetic material powder is weighed. When a mixture of borosilicate glass powder and forsterite powder is used as the non-magnetic material, a glass powder containing potassium, boron, silicon, and aluminum in a prescribed ratio is prepared as the borosilicate glass. In addition, forsterite powder is prepared.

The borosilicate glass preferably contains Si at a ratio of around 80 wt % to around 85 wt % in terms of $SiO_2$, B at a ratio of around 10 wt % to around 25 wt % in terms of $B_2O_3$, an alkali metal A at a ratio of around 0.5 wt % to around 5 wt % in terms of $A_2O$, and Al at a ratio of around 0 wt % to around 5 wt % in terms of $Al_2O_3$.

Green Sheet Manufacturing Process

The ferrite material and the non-magnetic material are weighed in a prescribed ratio. Next, these weighed materials are mixed with an organic binder such as polyvinyl butyral resin, an organic solvent such as ethanol or toluene, a plasticizer, and so forth and then the mixture is pulverized to produce a slurry. The obtained slurry is then molded into a sheet of a prescribed thickness using a doctor blade method or another method and then punched into a predetermined shape to produce green sheets.

The thickness of the green sheets is preferably around 20 µm to around 30 µm.

The ferrite material and the non-magnetic material are preferably mixed while adjusting the volume ratio of the ferrite material and the non-magnetic material so that the ratio of the volume of the non-magnetic material to the total volume of the ferrite material and the non-magnetic material is around 50 vol % to around 80 vol %.

Conductor Pattern Forming Process

First, via holes are formed by performing laser irradiation at prescribed locations on the green sheets.

Next, a conductive paste such as a silver paste is applied to the surfaces of the green sheets while filling the via holes by using a screen printing method or the like. Thus, coil-conductor conductor patterns, which are connected to via-conductor conductor patterns, are formed on the surfaces of the green sheets while forming the via-conductor conductor patterns inside the via holes in the green sheets. In this way, coil sheets are manufactured in which the coil-conductor conductor patterns and the via-conductor conductor patterns are formed on and in the green sheets. A plurality of the coil sheets are manufactured and coil-conductor conductor pattern corresponding to the coil conductors illustrated in FIGS. 3 and 4 and via-conductor conductor patterns corresponding to the via conductors illustrated in FIGS. 3 and 4 are formed on and in the coil sheets.

In addition, separately from the coil sheets, via sheets are manufactured in which via-conductor conductor patterns are formed in the green sheets by filling the via holes in the green sheets with a conductive paste such as a silver paste using a screen printing method or the like. A plurality of the via sheets are manufactured and via-conductor conductor patterns corresponding to the via conductors illustrated in FIGS. 3 and 4 are formed in the via sheets.

Multilayer Body Block Manufacturing Process

A multilayer body block is manufactured by stacking the coil sheets and the via sheets in the stacking direction in the order illustrated in FIGS. 3 and 4 and then subjecting the stacked sheets to thermal pressure bonding.

Multilayer Body and Coil Manufacturing Process

First, individual chips are manufactured by cutting the multilayer body block into pieces of a prescribed size using a dicer or the like.

Next, the individual chips are fired. The firing temperature is, for example, around 900° ° C. to around 920° ° C. Furthermore, the firing time is around 2 hours to around 8 hours, for example.

By firing the individual chips, the green sheets of the coil sheets and the via sheets become insulating layers. As a result, multilayer bodies in each of which a plurality of insulating layer are stacked in the stacking direction, in this case, length direction are manufactured. The ferrite phase and the non-magnetic phase are formed in the multilayer bodies.

The coil-conductor conductor patterns and the via-conductor conductor patterns of the coil sheets become the coil conductors and the via conductors when the individual chips are fired. As a result, coils are manufactured in which a plurality of coil conductors are electrically connected to each other by the via conductors while being stacked in the stacking direction.

In this way, a multilayer body and a coil provided inside the multilayer body are manufactured. The stacking direction of the insulating layers and the direction of the coil axis of the coil are parallel to the first main surface, which is the mounting surface, of the multilayer body and are parallel to the length direction in this case.

The via-conductor conductor patterns of the via sheets become the via conductors when the individual chips are fired. As a result, the first connection conductor and the second connection conductor are manufactured in which the plurality of via conductors are electrically connected to each other while being stacked in the length direction. The first connection conductor is exposed from the first end surface of the multilayer body. The second connection conductor is exposed from the second end surface of the multilayer body.

The corner portions and edge portions of the multilayer body may be rounded by performing barrel polishing, for example.

Outer Electrode Forming Process

First, a conductive paste containing silver and glass frit is applied to the first end surface and the second end surface of the multilayer body. Next, the base electrode layers are formed on the surfaces of the multilayer body by baking the resulting coatings. More specifically, a base electrode layer is formed so as to extend from the first end surface of the multilayer body across part of the first main surface, part of the second main surface, part of the first side surface, and part of the second side surface. In addition, a base electrode layer is formed so as to extend from the second end surface of the multilayer body across part of the first main surface, part of the second main surface, part of the first side surface, and part of the second side surface. The baking temperature of the coatings is around 800° C. to around 820° C., for example.

After that, a nickel coating and a tin coating are sequentially formed on the surface of each base electrode layer by performing electrolytic plating or the like.

Thus, the first outer electrode that is electrically connected to the coil via the first connection conductor and the second outer electrode that is electrically connected to the coil via the second connection conductor are formed.

Thus, the multilayer coil component is manufactured.

EXAMPLES

Hereafter, examples that illustrate a multilayer coil component of the present disclosure in a more specific manner will be described. The present disclosure is not limited to the following examples.

Examples 1 to 4 and Comparative Example 1

Multilayer bodies for multilayer coil components of Examples 1 to 4 and Comparative Example 1 were manufactured using the following method.

Ferrite Material Manufacturing Process

The main components were weighed so as to obtain a ratio of 48.0 mol % $Fe_2O_3$, 30.0 mol % ZnO, 14.0 mol % NiO, and 8.0 mol % CuO. Next, a slurry was manufactured by putting these weighed materials, pure water, and a dispersant into a ball mill along with PSZ media, mixing these materials together, and then pulverizing the mixture. The resulting slurry was dried and then preliminarily fired for two hours at 800° C. A powdered ferrite material was manufactured in this way.

Non-Magnetic Material Manufacturing Process

Borosilicate glass powder and forsterite powder were weighed so as to obtain a ratio of borosilicate glass:forsterite of 57.5:2.5 by volume. Next, a slurry was manufactured by putting these weighed materials, pure water, and a dispersant into a ball mill along with PSZ media, mixing these materials together, and then pulverizing the mixture. The resulting slurry was dried and then preliminarily fired for two hours at 1100° C. A powdered non-magnetic material was manufactured in this way.

Green Sheet Manufacturing Process

The ferrite material and the non-magnetic material were weighed so that the volume ratio of the ferrite phase and the non-magnetic phase that were formed later had the values listed in Table 1 below. Next, a slurry was manufactured by putting these weighed materials, polyvinyl butyral resin serving as an organic binder, and ethanol and toluene serving as organic solvents into a ball mill along with PSZ media, mixing these material together, and then pulverizing the mixture. The obtained slurry was then molded into a sheet of a prescribed thickness using a doctor blade method and then punched into a predetermined shape to produce green sheets.

Conductor Pattern Forming Process

An inner-conductor conductive paste containing silver powder and an organic vehicle was prepared.

Coil sheets were obtained by forming via holes at prescribed locations in green sheets, forming via conductors by filling the via holes with the conductive paste, and forming coil conductor patterns by performing printing.

Separately, via holes were formed by irradiating prescribed locations on green sheets with a laser. Via sheets were obtained by forming via conductors by filling the via holes with the conductive paste.

Multilayer Body Block Manufacturing Process

A multilayer body block was manufactured by stacking the coil sheets and the via sheets in the stacking direction in the order illustrated in FIGS. 3 and 4 and then subjecting the stacked sheets to thermal pressure bonding.

Multilayer Body and Coil Manufacturing Process

Individual chips were manufactured by cutting the multilayer body block into individual pieces using a dicer. Next, multilayer bodies were obtained by firing the individual chips at 910° ° C. for 5 hours. The ferrite phase and the non-magnetic phase were formed in the multilayer bodies.

Outer Electrode Forming Process

An outer-electrode conductive paste containing silver powder and glass frit was poured into a coating forming tank in order to form coating film of a prescribed thickness. The places where the outer electrodes were to be formed on each multilayer body were immersed in the coating film.

After the immersion, each multilayer body was baked at a temperature of 800° C. and in this way the base electrode layers of the outer electrodes were formed.

Next, the outer electrodes were formed by sequentially forming a nickel coating and a tin coating on each base electrode layer by performing electrolytic plating.

The multilayer coil components of Examples 1 to 4 and Comparative Example 1 were manufactured as described above.

Examples 1 to 4 have compositions in which the mixing ratio of the ferrite material and the non-magnetic material was varied and Comparative Example 1 has a composition in which a non-magnetic material was not used.

Volume Ratio of Ferrite Phase and Non-Magnetic Phase

The periphery of each multilayer coil component was sealed with resin and then a cross section along the stacking direction was exposed by grinding down the multilayer coil component up to a center portion of the multilayer body in a direction perpendicular to the stacking direction. Three 50 μm square regions were extracted from the vicinity of the center of the exposed cross section and the regions were subjected to elemental mapping using energy dispersive X-ray analysis performed using a scanning transmission electron microscope "HD-2300A" manufactured by Hitachi High-Technologies Corporation. As a result, it was confirmed that there were regions where the element Fe was present and regions where the element Fe was not present. In this way, the two phases were distinguished from each other by regarding regions where the Fe element was present as making up the ferrite phase and regions other than the ferrite phase as making up the non-magnetic phase.

Next, the ratio of the area of the non-magnetic phase to the total area of the ferrite phase and the non-magnetic phase was measured using image analysis software from the obtained elemental mapping image for each of the three regions described above. Then, an average value was calculated from the measured values of these area ratios and this average value was taken to be the ratio of the area of the non-magnetic phase to the total area of the ferrite phase and the non-magnetic phase.

The area ratio of the non-magnetic phase obtained in this way was substantially identical to the ratio of the volume of the non-magnetic material to the total volume of the ferrite material and the non-magnetic material weighed while manufacturing the multilayer body, and therefore the area ratio of the non-magnetic phase was used as the ratio of the volume of the non-magnetic phase to the total volume of the ferrite material and the non-magnetic phase. In Table 1, the ratio of the volume of the ferrite phase to the total volume of the ferrite phase and the non-magnetic phase was expressed as 100-"volume ratio of non-magnetic phase".

Measurement of Relative Dielectric Constant

A dielectric constant measurement test piece was manufactured by molding the ferrite material used to manufacture the multilayer coil components into a disk shape, electrodes composed of an In—Ga alloy were formed on both surfaces of the test piece, and then the electrostatic capacitance of the test piece was measured under conditions of a frequency of 1 MHz and a voltage of 1 Vrms. The relative dielectric constant was calculated from the diameter and thickness of the disk-shaped test piece on the basis of the measured value of the electrostatic capacitance.

The relative dielectric constant was also calculated for the non-magnetic material used in the manufacture of the multilayer coil components using the same procedure.

The relative dielectric constant of the ferrite material was 15.0 and the relative dielectric constant of the non-magnetic material was 4.0.

Composition

The composition of the insulating layers was confirmed by performing analysis using inductively coupled plasma atomic emission spectroscopy. In Table 1, the composition of each component is listed with the total of K2O, $B_2O_3$, $SiO_2$, $Al_2O_3$, MgO, $Fe_2O_3$, NiO, ZnO, and CuO being 100 wt %.

TABLE 1

| | VOLUME RATIO (VOL %) | | INDUCTIVELY COUPLED PLASMA ATOMIC EMISSION SPECTROSCOPY (ICP-AES) ANALYSIS RESULTS (WT %) | | | | | | | | |
|---|---|---|---|---|---|---|---|---|---|---|---|
| | FERRITE MATERIAL | NON-MAGNETIC MATERIAL | $K_2O$ | $B_2O_3$ | $SiO_2$ | $Al_2O_3$ | MgO | $Fe_2O_3$ | NiO | ZnO | CuO |
| EXAMPLE 1 | 45 | 55 | 0.4 | 4.3 | 27.6 | 0.1 | 1.1 | 43.5 | 5.9 | 13.5 | 3.6 |
| EXAMPLE 2 | 40 | 60 | 0.5 | 4.9 | 31.5 | 0.1 | 1.3 | 40.4 | 5.5 | 12.5 | 3.3 |
| EXAMPLE 3 | 30 | 70 | 0.6 | 6.3 | 40.4 | 0.1 | 1.7 | 33.4 | 4.5 | 10.3 | 2.7 |
| EXAMPLE 4 | 20 | 80 | 0.7 | 8.0 | 51.4 | 0.1 | 2.1 | 24.7 | 3.3 | 7.7 | 2.0 |
| COMPARATIVE EXAMPLE 1 | 100 | 0 | — | — | — | — | — | 65.5 | 8.8 | 20.3 | 5.4 |

Measurement of Transmission Coefficient S21

Figure 5:
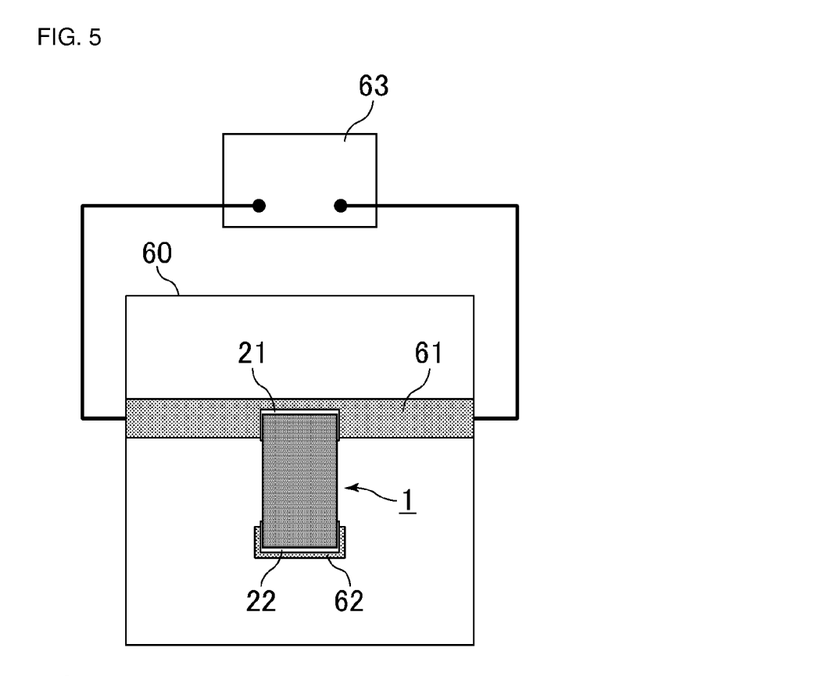
FIG. 5 is a diagram schematically illustrating a method of measuring the transmission coefficient.

FIG. 5 is a diagram schematically illustrating a method of measuring the transmission coefficient S21.

As illustrated in FIG. 5, a test piece (multilayer coil component 1) was soldered to a measurement jig 60 that was provided with a signal path 61 and a ground conductor 62. The first outer electrode 21 of the multilayer coil component 1 was connected to the signal path 61 and the second outer electrode 22 of the multilayer coil component 1 was connected to the ground conductor 62.

The transmission coefficient S21 was measured by obtaining the power of an input signal to the test piece and the power of a transmitted signal from the test piece and varying the signal frequency using a network analyzer 63. The two ends of the signal path 61 were connected to the network analyzer 63.

Figure 6:
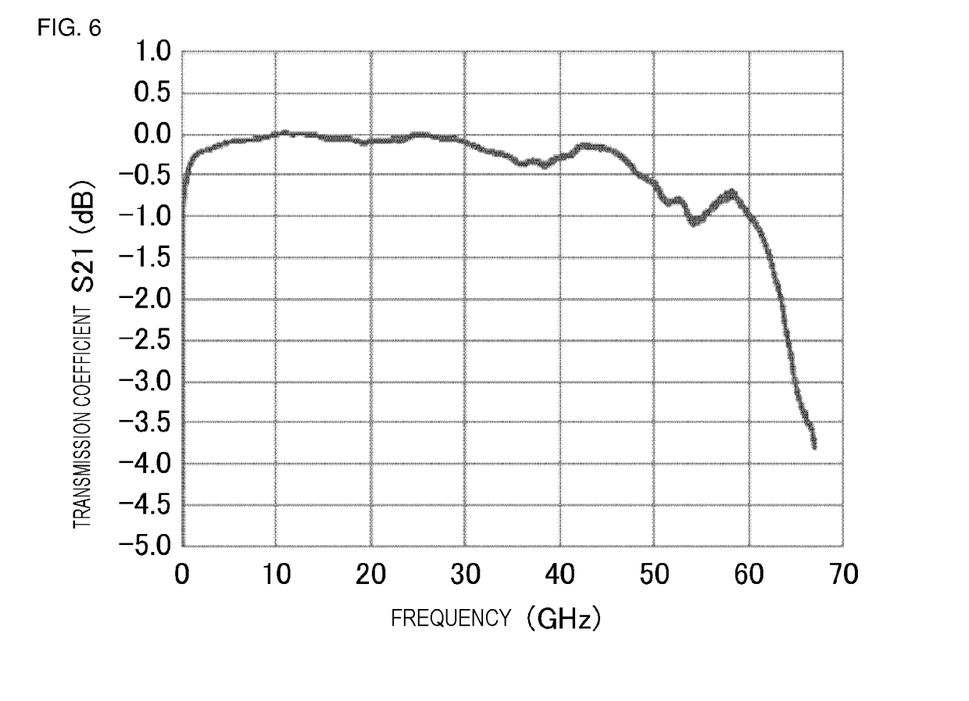
FIG. 6 is a graph illustrating the transmission coefficient of a test piece manufactured in Example 2.

FIG. 6 is a graph illustrating the transmission coefficient S21 of the test piece manufactured in Example 2.

Figure 7:
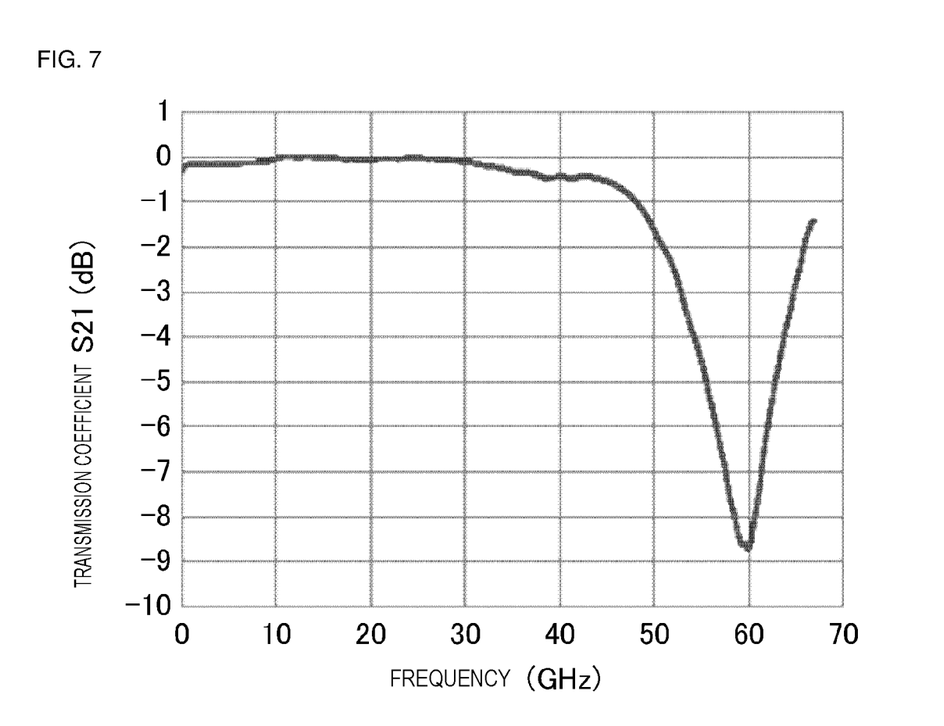
FIG. 7 is a graph illustrating the transmission coefficient of a test piece manufactured in Comparative Example 1.

FIG. 7 is a graph illustrating the transmission coefficient S21 of the test piece manufactured in Comparative Example 1.

The transmission coefficient S21 indicates that the closer the transmission coefficient S21 is to 0 dB, the smaller is the loss.

As illustrated in FIG. 6, the multilayer coil component manufactured in Example 2 had a transmission coefficient S21 of −1.0 dB or higher in a range from 1 GHz to 40 GHz and a transmission coefficient S21 of −1.5 dB or higher in a range from 40 GHz to 60 GHz and was a multilayer coil component suitable for use in a range up to a frequency of around 60 GHz.

In addition, as illustrated in FIG. 7, the multilayer coil component manufactured in Comparative Example 1 had large loss in a frequency range of 50 GHz and higher and the loss was very large at around −8.5 dB at a frequency of around 60 GHz.

In addition, although graphs of the transmission coefficient S21 thereof are not illustrated, the multilayer coil components manufactured in Example 1, Example 3, and Example 4 also had a transmission coefficient S21 of −1.0 dB or higher in a range from 1 GHz to 40 GHz and a transmission coefficient S21 of −1.5 dB or higher in a range from 40 GHz to 60 GHz and were multilayer coil components suitable for use in a range up to a frequency of around 60 GHz.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:
a multilayer body in which a plurality of insulating layers are stacked in a stacking direction, and a coil inside the multilayer body, the multilayer body having a first end surface and a second end surface, which face each other in a length direction, a first main surface and a second main surface, which face each other in a height direction perpendicular to the length direction, and a first side surface and a second side surface, which face each other in a width direction perpendicular to the length direction and the height direction; and
outer electrodes that are electrically connected to the coil, the outer electrodes including a first outer electrode that extends from at least part of the first end surface of the multilayer body across part of the first main surface and a second outer electrode that extends from at least part of the second end surface of the multilayer body across part of the first main surface,
wherein
the stacking direction of the multilayer body and a coil axis direction of the coil are parallel to the first main surface,
the insulating layers include a ferrite phase and a non-magnetic phase composed of a material having a lower dielectric constant than a ferrite material that constitutes the ferrite phase, and
a transmission coefficient S21 of the multilayer coil component is −1.0 dB or higher in a range from 1 GHz to 40 GHz and is −1.5 dB or higher in a range from 40 GHz to 60 GHz.

2. The multilayer coil component according to claim 1, wherein
a ratio of a volume of the non-magnetic phase to a total volume of the ferrite phase and the non-magnetic phase is from 55 vol % to 80 vol %.

3. The multilayer coil component according to claim 2, wherein
a ratio of a volume of forsterite to a total volume of the non-magnetic phase is from 2 vol % to 8 vol %.

4. The multilayer coil component according to claim 2, wherein
the insulating layers contain B at 4.3 wt % to 8.0 wt % in terms of $B_2O_3$,
Si at 27.6 wt % to 51.4 wt % in terms of $SiO_2$,
Mg at 1.1 wt % to 2.1 wt % in terms of MgO,
Fe at 24.7 wt % to 43.5 wt % in terms of $Fe_2O_3$,
Ni at 3.3 wt % to 5.9 wt % in terms of NiO,
Zn at 7.7 wt % to 13.5 wt % in terms of ZnO, and
Cu at 2.0 wt % to 3.6 wt % in terms of CuO.

5. The multilayer coil component according to claim 3, wherein
the insulating layers contain B at 4.3 wt % to 8.0 wt % in terms of $B_2O_3$,
Si at 27.6 wt % to 51.4 wt % in terms of $SiO_2$,
Mg at 1.1 wt % to 2.1 wt % in terms of MgO,
Fe at 24.7 wt % to 43.5 wt % in terms of $Fe_2O_3$,
Ni at 3.3 wt % to 5.9 wt % in terms of NiO,
Zn at 7.7 wt % to 13.5 wt % in terms of ZnO, and
Cu at 2.0 wt % to 3.6 wt % in terms of CuO.

6. The multilayer coil component according to claim 1, wherein
a ratio of a volume of forsterite to a total volume of the non-magnetic phase is from 2 vol % to 8 vol %.

7. The multilayer coil component according to claim 6, wherein
the insulating layers contain B at 4.3 wt % to 8.0 wt % in terms of $B_2O_3$,
Si at 27.6 wt % to 51.4 wt % in terms of $SiO_2$,
Mg at 1.1 wt % to 2.1 wt % in terms of MgO,
Fe at 24.7 wt % to 43.5 wt % in terms of $Fe_2O_3$,
Ni at 3.3 wt % to 5.9 wt % in terms of NiO,
Zn at 7.7 wt % to 13.5 wt % in terms of ZnO, and
Cu at 2.0 wt % to 3.6 wt % in terms of CuO.

8. The multilayer coil component according to claim 1, wherein
the insulating layers contain B at 4.3 wt % to 8.0 wt % in terms of $B_2O_3$,
Si at 27.6 wt % to 51.4 wt % in terms of $SiO_2$,
Mg at 1.1 wt % to 2.1 wt % in terms of MgO,
Fe at 24.7 wt % to 43.5 wt % in terms of $Fe_2O_3$,
Ni at 3.3 wt % to 5.9 wt % in terms of NiO,
Zn at 7.7 wt % to 13.5 wt % in terms of ZnO, and
Cu at 2.0 wt % to 3.6 wt % in terms of CuO.

* * * * *